(12) United States Patent
Herfurth et al.

(10) Patent No.: US 8,061,242 B2
(45) Date of Patent: Nov. 22, 2011

(54) TOOL CARRIER DEVICE AND APPARATUS FOR PROCESSING FLAT BLANKS

(75) Inventors: Bernd Herfurth, Dresden (DE); Steffen Pieper, Dresden (DE)

(73) Assignee: KAMA GmbH (DE)

( * ) Notice: Subject to any disclaimer, the term of this patent is extended or adjusted under 35 U.S.C. 154(b) by 960 days.

(21) Appl. No.: 11/846,902

(22) Filed: Aug. 29, 2007

(65) Prior Publication Data

US 2008/0041202 A1 Feb. 21, 2008

(30) Foreign Application Priority Data

Aug. 1, 2007 (EP) .................................... 07113613

(51) Int. Cl.
*B23B 29/00* (2006.01)
*B23B 15/00* (2006.01)
(52) U.S. Cl. ........................................ 82/129; 82/124
(58) Field of Classification Search .................. 82/124, 82/127, 121, 129, 157, 158, 161; 29/561, 29/564, 50
See application file for complete search history.

(56) References Cited

U.S. PATENT DOCUMENTS

| | | | |
|---|---|---|---|
| 1,774,536 A | 9/1930 | Winkler et al. | |
| 2,395,352 A | 2/1946 | Staude et al. | |
| 2,470,754 A | 5/1949 | Alber | |
| 2,754,113 A | 7/1956 | Sjostrom | |
| 2,818,892 A * | 1/1958 | Price | 83/454 |
| 2,911,889 A | 11/1959 | Welsh | |
| 3,161,951 A * | 12/1964 | Anthony | 483/40 |
| 3,224,022 A * | 12/1965 | Kehr | 15/4 |
| 3,244,338 A * | 4/1966 | Ritter, Jr. et al. | 225/96.5 |
| 3,534,799 A * | 10/1970 | Luton | 157/13 |
| 3,543,978 A * | 12/1970 | Feillet | 225/2 |
| 3,605,576 A | 9/1971 | Shields | |
| 3,618,479 A | 11/1971 | Shields | |
| 3,652,080 A * | 3/1972 | Jenkins | 493/14 |
| 3,721,326 A | 3/1973 | Bussienne | |
| 3,748,937 A * | 7/1973 | Long | 83/887 |
| 3,890,755 A | 6/1975 | Specht | |
| 3,897,051 A | 7/1975 | Muller | |
| 4,012,996 A | 3/1977 | Stolkin et al. | |
| 4,052,932 A | 10/1977 | Huiskes | |

(Continued)

FOREIGN PATENT DOCUMENTS

CH 689300 A5 2/1999

(Continued)

OTHER PUBLICATIONS

Kluge Unifold, "Folding and Gluing System." 8 pages, 2001.

(Continued)

*Primary Examiner* — Will Fridie, Jr.
(74) *Attorney, Agent, or Firm* — Heslin Rothenberg Farley & Mesiti P.C.

(57) ABSTRACT

A tool carrier device for adjustable arrangement of tools along a forming path comprises two carrier rails arranged so as to run parallel to one another in the longitudinal direction of the forming path and above the latter, at least one cross member which can be detachably connected to both carrier rails at a plurality of predetermined positions along the forming path in such a way that the cross member is arranged transversely to the longitudinal direction of the forming path, and at least one tool holder which can be detachably connected to the cross member.

18 Claims, 3 Drawing Sheets

U.S. PATENT DOCUMENTS

Figure 1:
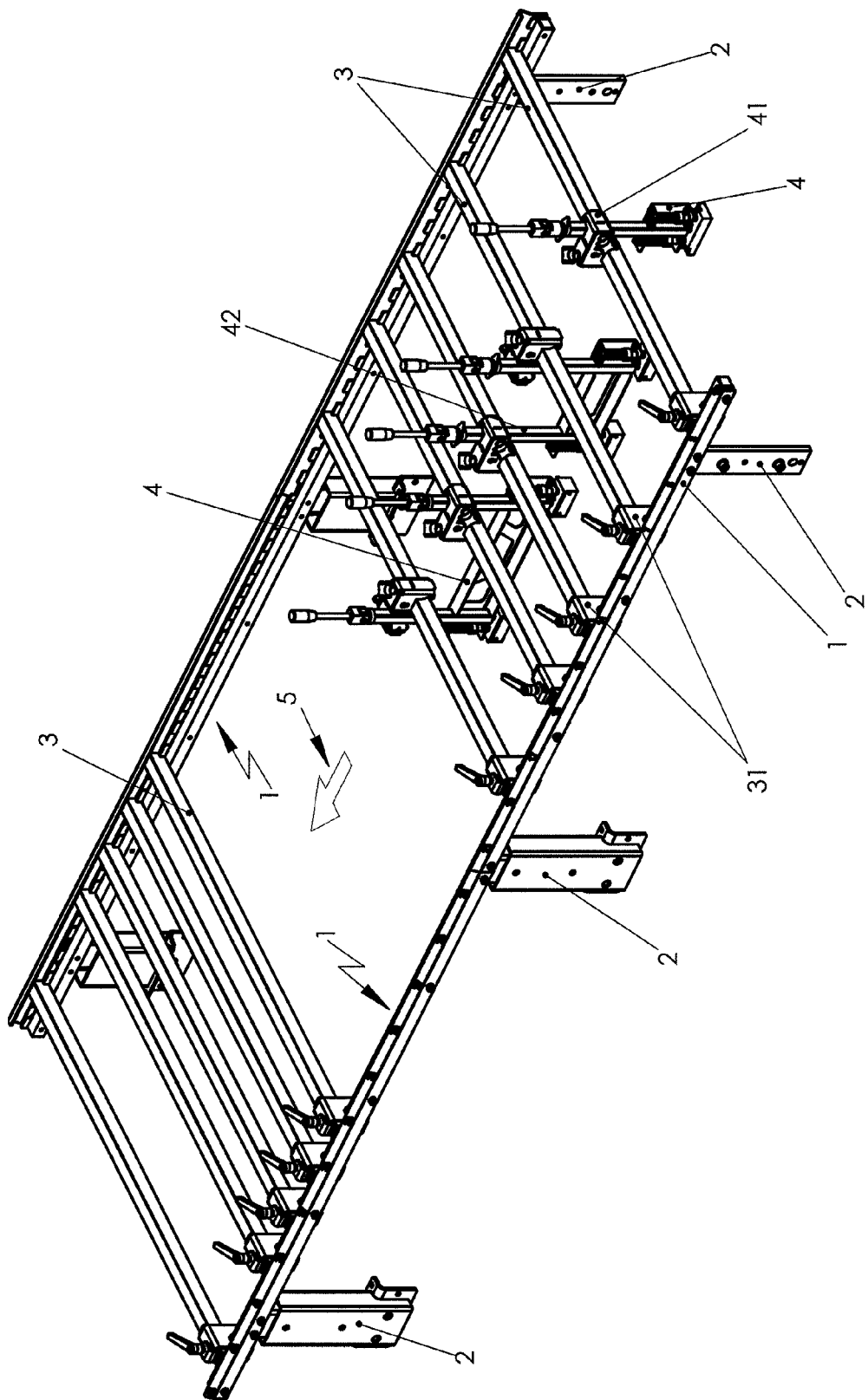

| | | | |
|---|---|---|---|
| 4,419,088 A * | 12/1983 | Nemec | 493/444 |
| 4,696,392 A | 9/1987 | Chisholm, Jr. | |
| 4,721,504 A | 1/1988 | Cogswell et al. | |
| 4,979,933 A | 12/1990 | Range | |
| 5,014,582 A | 5/1991 | Teik | |
| 5,019,026 A | 5/1991 | Jaton | |
| 5,047,000 A | 9/1991 | Lester | |
| 5,094,658 A | 3/1992 | Smithe et al. | |
| 5,151,075 A | 9/1992 | Beaulleu et al. | |
| 5,270,535 A | 12/1993 | Leser | |
| 5,394,979 A | 3/1995 | Hall et al. | |
| 5,413,327 A | 5/1995 | Reymond et al. | |
| 5,540,647 A | 7/1996 | Weiermann et al. | |
| 5,568,920 A | 10/1996 | Moll | |
| 5,771,950 A * | 6/1998 | Hardesty | 144/135.2 |
| 5,788,228 A | 8/1998 | Moll | |
| 5,820,540 A | 10/1998 | Bohn et al. | |
| 5,855,730 A | 1/1999 | Brusehaber | |
| 5,997,459 A | 12/1999 | Kruger et al. | |
| 6,092,446 A * | 7/2000 | Hardesty | 82/148 |
| 6,210,309 B1 | 4/2001 | Smithe et al. | |
| 6,309,336 B1 | 10/2001 | Muessig et al. | |
| 6,557,466 B2 | 5/2003 | Codde et al. | |
| 6,565,409 B1 | 5/2003 | Isogai | |
| 6,612,974 B2 | 9/2003 | Hooper | |
| 6,981,939 B2 | 1/2006 | Petratto | |
| 2003/0209116 A1 | 11/2003 | Culpepper | |

FOREIGN PATENT DOCUMENTS

| | | |
|---|---|---|
| DE | 2005020591 B3 | 1/2007 |
| EP | 1424191 A2 | 2/2005 |
| GB | 472372 A | 9/1937 |
| WO | 9952637 A1 | 10/1999 |
| WO | 02060678 A2 | 8/2002 |

OTHER PUBLICATIONS

Photo of Escomat D22, Construction year 1987.

Jagenberg—Operation of the Machine and Instructions for Adjustment, 5 pages, 1997.

KAMA FKM 100 Double Top Glue Applicator, 4 pages, 1995.

Jagenberg Diana 105-2: two possible positions for support frame, 3 pages, 1995.

* cited by examiner

TOOL CARRIER DEVICE AND APPARATUS FOR PROCESSING FLAT BLANKS

BACKGROUND ART

A tool carrier device, in particular for an apparatus for processing flat blanks, for example cardboard articles, and such an apparatus are described below. The blanks produced in a preceding processing step, for example by punching from sheets of paper or cardboard, must be folded, adhesively bonded, etc., in further processing steps in order to produce certain articles such as brochures, presentation folders, etc. The apparatus described serves to carry out such processing steps.

To this end, the apparatus comprises a transport device for transporting the blanks along a forming path. The transport device may comprise, for example, a plurality of transport rollers which are rotatably mounted on both sides in a respective bearing stand and of which at least some can be driven. Furthermore, the apparatus may comprise interchangeable tools for guiding the blanks on the transport device and for carrying out the individual processing steps, the positions of which relative to the transport rollers of the transport device can be adjustable. Such tools may be, for example, holddowns, folding shoulders, adhesive dispensers, air nozzles, sensors, etc., which fix the blanks against lateral slipping, fold the blanks, apply adhesive, blow in air, record certain measured values, etc.

Depending on the product to be made, different arrangements of various tools along the forming path are required. This means that, during each changeover in production, the type and sequence of the requisite tools has to be reconfigured. In this case, the quality of the products depends essentially on the accuracy of the positioning of the individual tools relative to the transport rollers of the transport device. The tool carrier device described permits accurate positioning of the tools.

BRIEF SUMMARY OF THE INVENTION

The proposed tool carrier device for the adjustable arrangement of tools along a forming path comprises two carrier rails arranged so as to run parallel to one another in the longitudinal direction of the forming path and above the latter, furthermore at least one cross member which can be detachably connected in each case to both carrier rails at a plurality of predetermined positions along the forming path in such a way that the cross member is arranged transversely to the longitudinal direction of the forming path, and furthermore at least one tool holder which can be detachably connected to the cross member.

Compared with solutions in which each tool holder is arranged on a separate bridge spanning the transport device of the apparatus for processing flat blanks, the advantage is obtained with the described solution that the position of a tool along the forming path can be changed quickly and simply owing to the fact that the carrier rails of the tool carrier device are fixedly installed relative to the transport device, and a cross member for accommodating a tool holder can be removed, when required, quickly and simply from a predetermined position and arranged in another predetermined position. This change in position, in the case of the tool carrier device according to the invention, can be carried out by a single operator and from one side of the transport device.

In a first configuration, provision is made for the tool holder to be capable of being located at any desired position along the cross member. Alternatively, the tool carrier device may also be configured in such a way that the tool holder can be located at a plurality of predetermined positions along the cross member.

The tool carrier device can be attached in many different ways to an apparatus for processing flat blanks, for example by the carrier rails being connected to elements, which are present anyway, of the frame of the apparatus. In one configuration, however, provision is also made for at least one supporting element for fixing the carrier rail above the forming path to be provided on each carrier rail. Such supporting elements may be, for example, perpendicular supporting bars which extend downward from the carrier rails, such that their bottom ends can be connected to elements of the transport device of the apparatus, for example the bearing stands of transport rollers of such a transport device.

In order to facilitate the changing of the position of a cross member along the forming path, provision may be made for at least one carrier rail, at each predetermined position, to have a locating means for the positive-locking locating of an end of a cross member. The arrangement of locating means at the predetermined positions facilitates the positioning of the cross members and prevents incorrect positioning. In order to facilitate this, provision may be made, for example, for the locating means to be designed for pushing in one end of the cross member transversely to the longitudinal direction of the forming path. In this way, the end of the cross member is clearly positioned at least in the longitudinal direction of the forming path.

For example, such a locating means may be configured in such a way that the locating means has a recess which corresponds to the cross section of the cross member and which, in a development, may be open at the top.

In a simple configuration, both the carrier rail and the cross members are produced from a rectangular hollow profile, rectangular holes being arranged in a side surface of the carrier rail at the predetermined positions, the shape of said holes corresponding to the cross section of the cross members.

In a carrier rail made of solid material, the same effect is achieved by a blind hole. The cross member can be pushed into such a rectangular hole laterally, that is to say transversely to the longitudinal direction of the forming path, such that the rectangular hole prevents a displacement of the cross member in the longitudinal direction of the forming path and in the vertical direction. The movement of the cross member in the horizontal direction transversely to the longitudinal direction of the forming path is limited by the second side surface of the rectangular hollow profile of the carrier rail, in which no holes are provided.

A further simple configuration of the tool carrier device provides for bores to be provided in a bearing surface of the carrier rail and for pins which can be inserted into the bores of the carrier rail to be provided on the underside of the cross member. Alternatively, the pins may be provided on the bearing surface of the carrier rail and the bores may be provided on the undersides of the cross members. All the configurations are given purely by way of example; further configurations of the proposed concept for arranging the cross members at predetermined positions of the carrier rail are possible without departing from the basic idea of the proposed tool carrier device.

In a further configuration of the proposed tool carrier device, provision is made for at least one carrier rail to comprise a bar having a flat bearing surface, at the lateral boundary of which a first material strip is arranged so as to run parallel to the bar, which first material strip projects above the bearing surface and has at each predetermined position a recess open at the top. In this case, the cross member can be inserted with its end into the recess from above, such that the end of the cross member rests on the bearing surface and is arranged in the recess, open at the top, in such a way that a displacement of the cross member in the longitudinal direction of the forming path is prevented. Further measures for preventing or limiting movements in the two other spatial directions may be provided at the carrier rail or/and at the cross member, for example in the form of stops.

In an exemplary configuration, provision may be made for a second material strip to be provided on that side of the first material strip which faces away from the bearing surface, which second material strip assumes the function of a stop which limits the movement of the cross member transversely to the longitudinal direction of the bar. Furthermore, provision may be made for the second material strip to project above the first material strip, and for the top region of the second material strip to be folded in such a way that the folded top region of the second material strip projects horizontally over the first material strip and thus assumes the function of a stop, or hold-down, which limits the movement of the cross member in the vertical direction.

Furthermore, provision may be made for at least one cross member to have, at least at one end, a clamping device for producing a frictional connection to the carrier rail. In this case, the corresponding end of the cross member is held at the desired position by the force exerted on the carrier rail by the clamping device.

In an exemplary embodiment, a first carrier rail of the tool carrier device comprises a bar having a flat bearing surface, at the lateral boundary of which a first material strip having recesses and a second material strip having a folded top region are arranged so as to run parallel to the bar, and a second carrier rail of the tool carrier device comprises a bar having a flat bearing surface, at the lateral boundary of which a first material strip having recesses is arranged so as to run parallel to the bar. The cross members in this exemplary embodiment are rectangular hollow profiles, which are each provided at one end with a clamping device.

A cross member can be attached at a predetermined position by one operator from one side of the transport device by the first end of the cross member, which first end has no clamping device, being pushed into locating means jointly formed by a recess of the first material strip and by the folded top region of the second material strip, and then by the second end of the cross member, which second end has a clamping device, being inserted from above into the locating means formed by a recess, open at the top, of the first material strip of the second carrier rail, such that the second end rests on the bearing surface of the second carrier rail, and finally a frictional connection between the second end of the cross member and the second carrier rail is produced by means of the clamping device.

The tool holder of the tool carrier device described may have a retaining strut for connecting to the cross member, which retaining strut can be frictionally attached to the cross member by a clamping device. In this case, provision may be made for the retaining strut to comprise a height adjusting device for the vertical adjustment of the tool. In one configuration, provision is made for the height adjusting device to comprise an eccentric lever which rests on the top end of a first component, which can be connected to the cross member, and is rotatably mounted on a second component, carrying the tool, of the retaining strut in such a way that the tool, when the eccentric lever is actuated, is vertically lowered or raised, depending on the actuating direction of the latter.

Such a first component of the retaining strut may be, for example, a tubular sleeve which is connected to the cross member by means of a clamping device. The second component of the retaining strut may be a bar which is displaceably mounted in the tubular sleeve and to the bottom end of which the tool is attached. The displaceably mounted bar with the tool arranged thereon is in a first, raised position in a first position of the eccentric lever and in a second, lowered position in a second position of the eccentric lever. Alternatively or additionally, provision may be made for the height adjusting device to comprise means for the infinitely variable fine adjustment of the vertical position of the tool, for example adjusting screws having a fine thread.

Furthermore, to facilitate work when producing a predetermined configuration of the tools relative to the transport device, provision may be made for a designation to be visibly provided on at least one carrier rail in the region of at least one predetermined position, said designation clearly identifying said position. For example, the predetermined positions can be numbered consecutively and the associated numbers can be provided on the inside and/or the outside of the carrier rail.

Here, a clearly identifying designation need not be provided at each predetermined position; in many cases it is sufficient if a designation is provided only at every second or every fifth position, etc. Such identification of predetermined positions may also be used, for example, for control processes at the tools, for example by a stored-program controller (SPC) being provided on the apparatus, in the data memory of which information about the coordinates of each predetermined position is stored, such that control sequences for new tool configurations can be programmed in a simple manner.

A tool carrier apparatus of the type described above may be part of an apparatus for processing flat blanks. Such an apparatus may comprise, in addition to the tool carrier device, a transport device for transporting the blanks along the forming path, which transport device comprises an arrangement of transport rollers rotatably mounted at the same distance apart on both sides of the forming path and in which the tool carrier device is arranged in such a way that the tool or tools is/are arranged such that it/they can be positioned relative to the transport rollers. However, provision is advantageously made for the distance between predetermined positions along the carrier rails of the tool carrier device to be equal to the distance between the transport rollers of the transport device.

This results in a spatial relationship between the tool holder—and thus between the tool arranged thereon—and the transport rollers of the transport device of a corresponding apparatus for processing flat blanks, without further adjusting measures.

The tools, due to their fastening on each transverse strut, are always oriented exactly in the respectively desired position relative to the transport rollers in the longitudinal direction of the forming path, such that, for example, pressure rollers of hold-downs are always congruent with transport rollers arranged underneath in order to achieve an optimum result. In the same way, for example, adhesive dispensers, air nozzles, sensors, etc., are positioned exactly above a gap between two adjacent transport rollers by correspondingly configured tool holders being fastened to a cross member in a simple manner without further adjustment of the position in the longitudinal direction of the transport path. In this case, the fastening of the tools is possible both in front of and behind a transverse strut; further adjustment in the longitudinal direction is not necessary.

Due to the identification of predetermined setting-up positions, repetitive work and tool configurations can be rapidly set up. The transfer of the positions of set-up tools with the aid of a clearly identifying designation, for example to an SPC, makes it unnecessary to measure and input distances between sensors and controlled tools.

BRIEF DESCRIPTION OF THE DRAWING FIGURES

Figure 2:
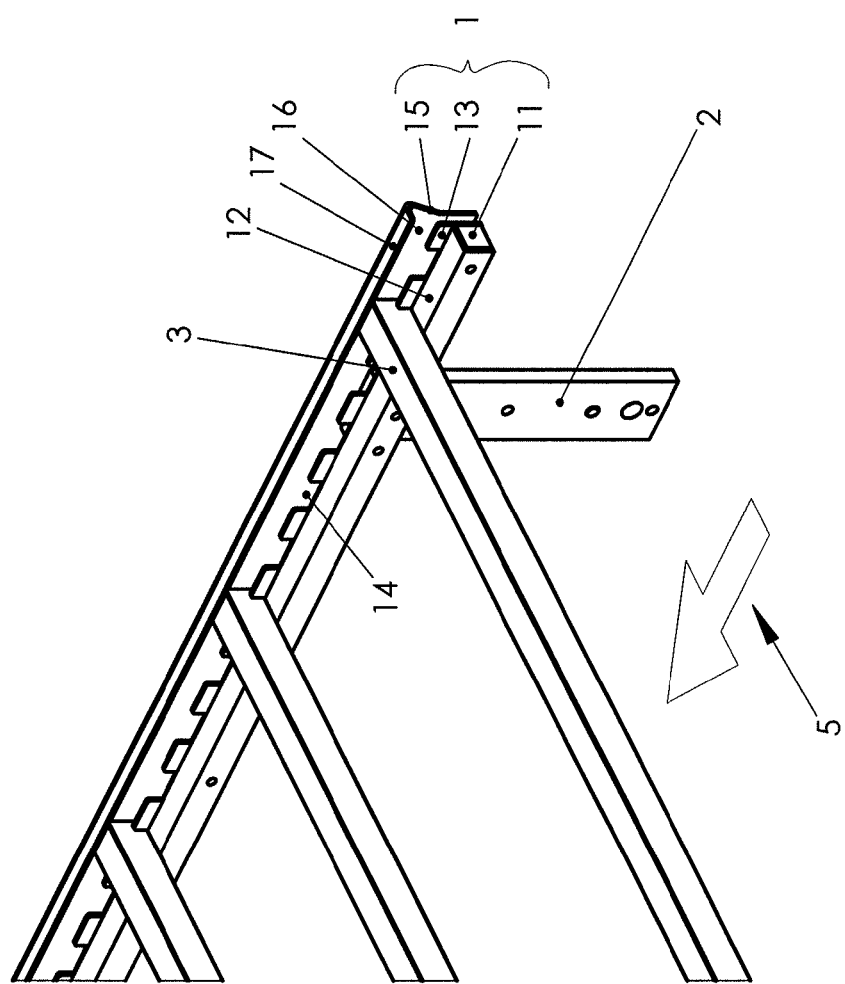
Figure 3:
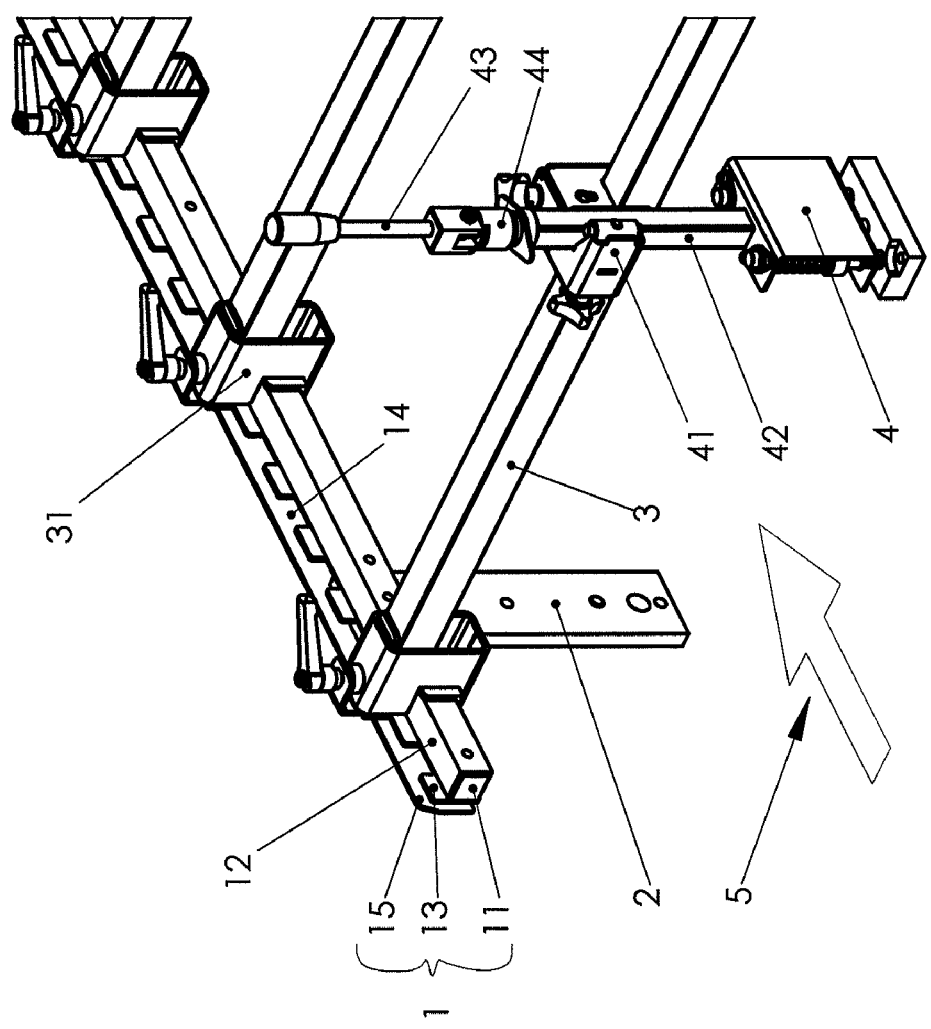

The tool carrier device described will be described in more detail below with reference to an exemplary embodiment and associated drawings, in which:

FIG. 1 shows the tool carrier device in perspective view,
FIG. 2 shows a detailed view of the first carrier rail, and
FIG. 3 shows a detailed view of the second carrier rail.

DETAILED DESCRIPTION

The tool carrier device in FIG. 1 for the adjustable arrangement of tools along a forming path 5 comprises two carrier rails 1 arranged so as to run parallel to one another in the longitudinal direction of the forming path 5 and above the latter. A plurality of cross members 3 are detachably connected in each case to both carrier rails 1 at one of several predetermined positions along the forming path 5 in such a way that the cross members 3 are arranged transversely to the longitudinal direction of the forming path 5. The cross members 3 each have a clamping device 31 at one end for producing a frictional connection to a carrier rail 1.

At some of the cross members 3, tool holders 4 are detachably connected to the respective cross member 3. The tool holders 4 can each be located at any desired positions along the cross member 3. The tool holders 4 comprise a retaining strut 42 for connecting to the cross member 3, said retaining strut 42 being frictionally attached to the cross member 3 by a clamping device 41.

Supporting elements 2 for fixing the carrier rail 1 above the forming path 5 are provided on each of the two carrier rails 1. In the exemplary embodiment, the supporting elements 2 are perpendicular supporting bars which extend downward from the carrier rails 1, such that their bottom ends can be connected to elements of the transport device of the apparatus, for example to the bearing stands of transport rollers of such a transport device.

A detailed view of a first carrier rail 1 is shown in FIG. 2. Arranged on the carrier rail 1 is a supporting element 2 for fixing the carrier rail 1 above the forming path 5. The carrier rail 1 comprises a bar 11 of rectangular cross section with a flat bearing surface 12. A first material strip 13 running parallel to the bar 11 and having recesses 14 open at the top is arranged at the outer lateral boundary of the bearing surface 12 of the bar 11, the recesses 14 serving as lateral stops against unintentional movements of the cross members 3 in the longitudinal direction of the forming path 5 for the cross members 3. A second material strip 15 having a folded top region 17 is arranged on that side of the first material strip 13 which faces away from the bearing surface 12, the bottom region 16 serving as a stop for the cross members 3 against unintentional movements of the cross members 3 transversely to the longitudinal direction of the forming path 5, and the folded top region 17 serving as a hold-down for the cross members 3.

The cross members 3, which in the exemplary embodiment are designed as bars of rectangular cross section, can be pushed by an operator in a simple manner into the locating means jointly formed by a recess 14 of the first material strip 13 and by the folded top region 17 of the second material strip 15, such that the end of the respective cross member 3 rests on the bearing surface 12 of the carrier rail 1 and is at the same time connected to the carrier rail 1 in a positive-locking manner.

Shown in FIG. 3 is a detailed view of a second carrier rail 1. Arranged on the carrier rail 1 is a supporting element 2 for fastening the carrier rail 1 above the forming path 5. The carrier rail 1 comprises a bar 11 of rectangular cross section with a flat bearing surface 12. A first material strip 13 running parallel to the bar 11 and having recesses 14 open at the top is arranged at the outer lateral boundary of the bearing surface 12 of the bar 11, the recesses 14 serving as lateral stops against unintentional movements of the cross members 3 in the longitudinal direction of the forming path 5 for the cross members 3. A second material strip 15 is arranged on that side of the first material strip 13 which faces away from the bearing surface 12 and serves as a stop for the cross members 3 against unintentional movements of the cross members 3 transversely to the longitudinal direction of the forming path 5.

Once the first end of a cross member 3, as described above with respect to FIG. 2, has been pushed from above into the locating means formed by a recess 14, open at the top, of the first material strip 13 and by the second material strip 15 of the first carrier rail 1, the second end of the cross member 3, which second end is provided with a clamping device 31, can be inserted from above into the locating means formed by a recess 14, open at the top, of the first material strip 13 and by the second material strip 15 of the second carrier rail 1, such that the second end of the cross member 3 rests on the bearing surface 12 of the second carrier rail 1, and finally a frictional connection between the second end of the cross member 3 and the second carrier rail 1 is produced by means of the clamping device 31.

A tool holder 4 is detachably fastened to one of the cross members 3 shown in the figure. As a result, the tool holder 4 can be located at any desired positions along the cross member 3. The tool holder 4 comprises a retaining strut 42 for connecting to the cross member 3, said retaining strut 42 being frictionally attached to the cross member by a clamping device 41.

A height adjusting device for the vertical adjustment of the tool comprises an eccentric lever 43 which rests on the top end of a tubular sleeve of the retaining strut 42, which is connected to the cross member 3 by means of the clamping device 41. The eccentric lever 43 is rotatably mounted on a bar, displaceably mounted in the tubular sleeve and carrying the tool at its bottom end, in such a way that the bar and thus the tool, when the eccentric lever 43 is actuated, are vertically lowered or raised, depending on the actuating direction of the latter. The displaceably mounted bar with the tool arranged thereon is in a first, raised position in a first position of the eccentric lever 43 and in a second, lowered position in a second position of the eccentric lever 43. Furthermore, the height adjusting device of the tool holder 4 comprises at least one adjusting screw 44 having a fine thread as a means for the infinitely variable fine adjustment of the vertical position of the tool.

What is claimed is:

1. An apparatus for processing flat blanks, the apparatus comprising:
    a tool carrier device for adjustable arrangement of tools along a forming path, the tool carrier device comprising:
        two carrier rails arranged so as to run parallel to one another in a longitudinal direction of the forming path and above the path;
        at least one cross member adapted to be detachably connected to both carrier rails at a plurality of predetermined positions along the forming path in such a way that the at least one cross member is arranged transversely to the longitudinal direction of the forming path; and at least one tool holder detachably connected to the at least one cross member; and a transport device for transporting the blanks along the forming path, the transport device comprises an arrangement of transport rollers rotatably mounted at a same distance apart on both sides of the forming path and wherein the tool carrier device is arranged in such a way that a tool or tools can be positioned relative to the transport rollers.

2. The apparatus as claimed in claim 1, wherein a distance between predetermined positions along the carrier rails of the tool carrier device is equal to a distance between the transport rollers of the transport device.

3. The apparatus as claimed in claim 1, wherein the flat blanks comprise one of sheets of paper and sheets of cardboard.

4. The apparatus as claimed in claim 1, wherein the tool holder is adapted to be located at any desired position along the at least one cross member.

5. The apparatus as claimed in claim 1, wherein the tool holder is adapted to be located at a plurality of predetermined positions along the at least one cross member.

6. The apparatus as claimed in claim 1, wherein at least one supporting element for fixing each carrier rail above the forming path is provided on each carrier rail.

7. The apparatus as claimed in claim 1, wherein at least one carrier rail, at each predetermined position, has a locating means for positive-locking locating an end of the cross member.

8. The apparatus as claimed in claim 7, wherein the locating means is adapted for pushing in one end of the cross member transversely to the longitudinal direction of the forming path.

9. The apparatus as claimed in claim 7, wherein the locating means has a recess corresponding to a cross section of the cross member.

10. The apparatus as claimed in claim 7, wherein at least one carrier rail comprises a bar having a flat bearing surface, at a lateral boundary of said surface a first material strip is arranged so as to run parallel to the bar, the first material strip projects above the bearing surface and has at each predetermined position a recess open at a top of the recess.

11. The apparatus as claimed in claim 10, wherein a second material strip is provided on a side of the first material strip which faces away from the bearing surface, the second material strip limits the movement of the at least one cross member transversely to the longitudinal direction of the bar.

12. The apparatus as claimed in claim 11, wherein the second material strip projects above the first material strip, and a top region of the second material strip is folded in such a way that the top region of the second material strip projects horizontally over the first material strip and thus limits movement of the at least one cross member in a vertical direction.

13. The apparatus as claimed in claim 1, wherein at least one cross member has, at least at one end, a clamping device for producing a frictional connection to one of the two carrier rails.

14. The apparatus as claimed in claim 1, wherein the tool holder has at least one retaining strut for connecting to the at least one cross member.

15. The apparatus as claimed in claim 14, wherein the retaining strut comprises a height adjusting device for vertical adjustment of a tool.

16. The apparatus as claimed in claim 15, wherein the height adjusting device comprises an eccentric lever operatively connected to a first retaining strut component connected to the at least one cross member, and to a second retaining strut component carrying the tool, in such a way that the tool, when the eccentric lever is actuated, is vertically lowered or raised, depending on actuating direction of the lever.

17. The apparatus as claimed in claim 15, wherein the height adjusting device comprises means for infinitely variable fine adjustment of vertical position of the tool.

18. The apparatus as claimed in claim 1, wherein a designation is visibly provided on at least one carrier rail in a region of at least one predetermined position, said designation clearly identifying said position.

\* \* \* \* \*